United States Patent [19]

Carlson et al.

[11] Patent Number: 5,241,592
[45] Date of Patent: Aug. 31, 1993

[54] TELEPHONIC HANDSET HOUSING ASSEMBLY FOR CORDLESS TELEPHONE

[75] Inventors: Kenneth W. Carlson, Hawthorn Woods; Steven C. Emmert, Arlington Heights, all of Ill.

[73] Assignee: Motorola, Inc., Schaumburg, Ill.

[21] Appl. No.: 738,401

[22] Filed: Jul. 31, 1991

[51] Int. Cl.⁵ .................. H04M 1/00; H04B 1/38; H05K 7/00
[52] U.S. Cl. ...................................... 379/433; 455/90; 361/814
[58] Field of Search ............................ 455/89, 90, 128; 361/422, 395, 399; 379/58, 61, 446, 447, 433

[56] References Cited

U.S. PATENT DOCUMENTS

| | | | |
|---|---|---|---|
| 4,089,044 | 5/1978 | Gatto et al. | 361/422 |
| 4,513,354 | 4/1985 | Abel | 361/422 |
| 4,631,640 | 12/1986 | Umetsu et al. | 361/422 |
| 4,641,370 | 2/1987 | Oyamada | 455/90 |
| 4,879,759 | 11/1989 | Matsumoto et al. | 361/422 |

Primary Examiner—James L. Dwyer
Assistant Examiner—Jack Chiang
Attorney, Agent, or Firm—Robert H. Kelly

[57] ABSTRACT

A telephonic handset housing assembly for a cordless telephone. The housing assembly comprises a carriage and a clip which is releasably engageable with the carriage. Because the clip is releasably engageable with the carriage, when the handset is not to be carried with an object, the clip may be removed so as not to form a portion of the handset housing assembly.

10 Claims, 4 Drawing Sheets

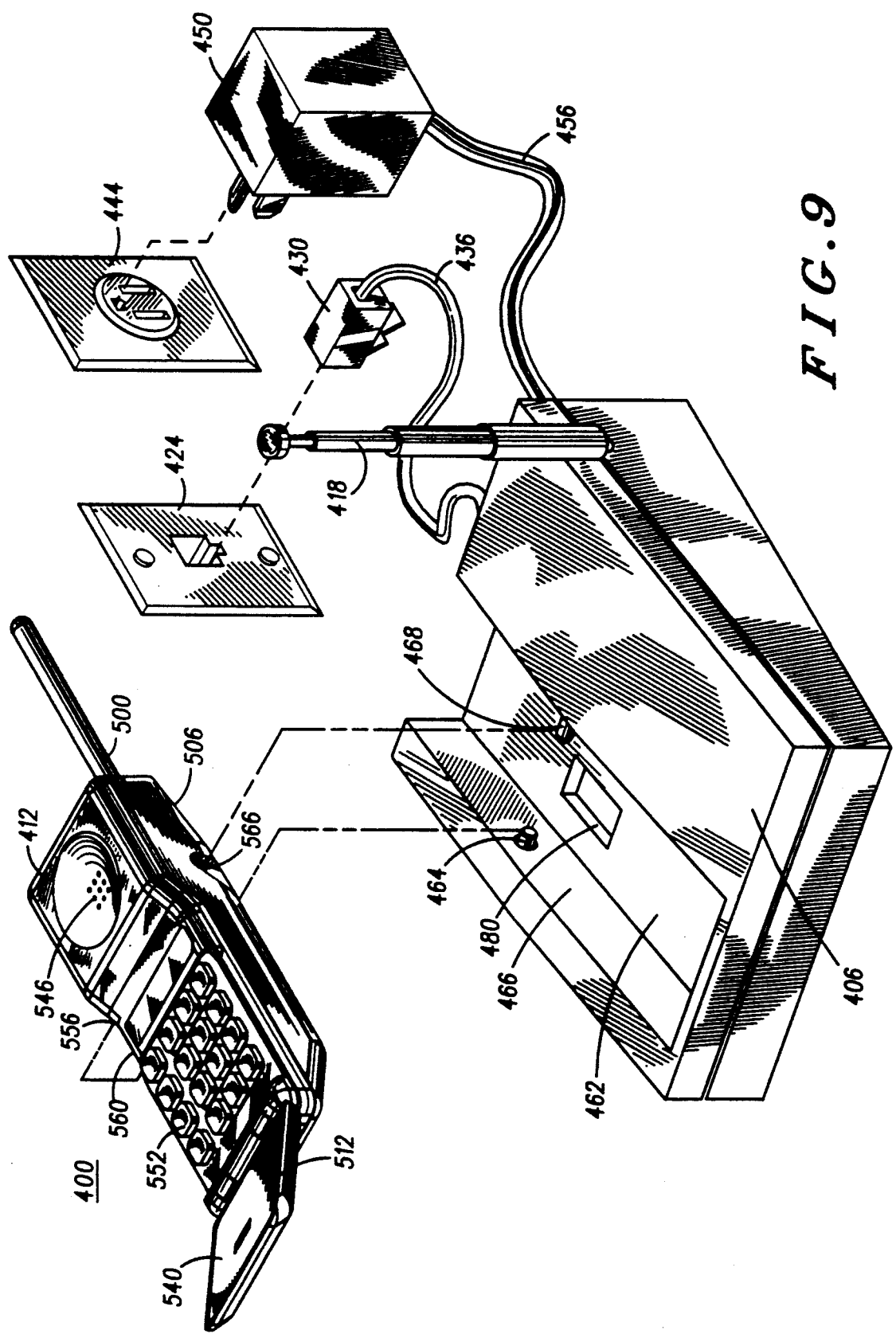

1

TELEPHONIC HANDSET HOUSING ASSEMBLY FOR CORDLESS TELEPHONE

BACKGROUND OF THE INVENTION

The present invention relates generally to telephonic handsets, and, more particularly, to a telephonic handset housing assembly having a removable clip forming a portion thereof for permitting fastening of the telephonic handset to an external object.

A conventional telephone is comprised of a telephone base assembly and a telephone handset. The base assembly and handset are interconnected by a telephone cord. The handset contains a speaker and a microphone to permit a user to speak into the telephone and to hear signals transmitted to the telephone over the telephone network. The base assembly is coupled to a telephonic outlet which permits connection of the telephone to a conventional telephone network whereby communication between the telephone and a remote location may be effectuated.

A cordless telephone, while comprised of a telephone base assembly and a telephone handset, as its name implies, does not require a telephone cord to interconnect the handset with the base assembly. Both the handset and base assembly includes additional circuitry to permit transmission of signals between the handset and the base assembly to obviate thereby the need for the telephone cord.

More particularly, both the handset and the base assembly of a cordless telephone include circuitry forming transceivers for generating radio frequency signals transmitted thereto. The circuitry forming the transceiver disposed within the base assembly of the cordless telephone generates radio frequency signals which are transmitted to the circuitry forming the transceiver disposed within the handset. Similarly, circuitry forming the transceiver disposed within the handset of the cordless telephone includes circuitry for transmitting a radio frequency signal to the base assembly of the cordless telephone, and for receiving the radio frequency signal transmitted to the handset by the base assembly.

The circuitry forming the transceivers of both the base assembly and the handset of the cordless telephone are typically disposed upon one or more circuit boards and housed within the housing of the base assembly and the handset, respectively. The circuitry forming the transceiver of the base assembly is provided power by electrical connection to a conventional power supply, such as by connection to a conventional household, electrical outlet. The circuitry forming the transceiver of the handset of the cordless telephone is powered by a battery power supply wherein the battery power supply is carried within the housing of the handset.

The circuitry forming the transceives of both the base portion and the handset of the cordless telephone generate low-power, radio frequency signals, typically of frequencies of approximately fifty megahertz. Because the signals are of low-power, the transmission ranges of the signal generated by the respective circuitry of the handset and the base assembly of the cordless telephone are typically on the order of approximately six hundred feet.

As no cord is required to interconnect the base assembly and the handset of a cordless telephone, the user of the cordless telephone need not be positioned in close proximity (i.e., within the length of a telephone cord which interconnects the handset and base assembly of a conventional telephone) to the base assembly of the phone to effectuate communication. To the contrary, the user may carry the handset to any location within the transmission range of the circuitry forming the transceivers of the two portions of the cordless telephone.

When a telephone call is to be received by the user, the circuitry forming the transceiver located within the base assembly of the cordless telephone transmits a radio frequency signal which is received by the transceiver circuitry of the handset. Appropriate annunciation is made by circuitry of the handset to indicate reception of a telephone call. A user is thereby able to receive a telephone call even when positioned at a location remote from the location of the base assembly of the cordless telephone.

The handset of the cordless phone typically also includes apparatus necessary to permit the user to institute a telephone call when positioned at a location remote from the location of the base assembly of the cordless telephone. Typically, a conventional, telephonic keypad is disposed upon the handset. Depression of a desired sequence of keys of the keypad permits a user to institute a telephone call thereby. Signals representative of such sequence of digits are transmitted by the circuitry forming the transceiver of the handset, and received by the circuitry forming the transceiver of the base portion of the cordless telephone. A telephone call may be completed by conventional techniques.

A cordless telephone increases the mobility permitted of a user who wishes to receive or to place telephone calls as the user need not be positioned within close proximity to a base assembly of a telephone in order to place, or to receive, the telephone call. For instance, a user, while at home, may perform outside yard work tasks, or may otherwise be positioned at a location not in proximity to the base assembly of the cordless telephone. By carrying of the handset or by otherwise positioning the handset in close proximity to the user, the user is able to place, or to receive, telephone calls.

However, the user frequently moves about during performance of such yard work tasks. The handset must be carried by the user or be repeatedly picked up and repositioned by the user as the user moves about. If the user is wearing clothing having oversized pockets, the user may be able to carry the handset within such oversized pockets. Carriage of the handset by the user as the user moves to different locations is thereby automatic. However, when the user is not wearing clothing having such oversized pockets, the handset must be, as just mentioned, repeatedly picked up and repositioned each time in which the user changes location to maintain the handset in close proximity to the user. Even when carried in such an oversized pocket, tasks performed by the user, such as tasks involving bending motions, may result in the handset falling out of the pocket in which the handset is carried.

As typically, the user does not wear clothing having oversized pockets of sizes permitting positioning of a handset therewithin, a user much more frequently repeatedly picks up and repositions the handset each time in which the user moves about to different locations. As such repeated repositioning of the handset may be inconvenient, or the user may forget to reposition the handset as the user changes location, means by which the user could affix the handset to an article of clothing, other than a pocket, to ensure that the handset would be carried by the user as the user changes location would be beneficial.

However, the need for such means is, in many other instances, not necessary as carriage of the handset in manners requiring such means may occur only infrequently, if at all. For instance, a clip permanently affixed to the handset to form such means may be considered displeasing by one who does not have need for the utilitarian functions thereof.

It would therefore be desirable if the handset design would permit such means to form a portion of the handset only when needed by the user.

SUMMARY OF THE INVENTION

The present invention, accordingly, advantageously provides a telephonic handset housing assembly for a cordless telephone having a clip forming a portion thereof to permit affixation of the handset housing to an external object.

The present invention further advantageously provides a telephonic handset housing assembly having a clip which is releasably engageable with the housing to permit the clip to be engaged with the housing assembly, or to be disengaged therefrom.

The present invention yet further advantageously provides a cordless telephone having a handset forming a portion thereof which includes a clip which is releasably engageable therewith.

The present invention provides further advantages and features, the details of which will be become more evident by reading the detailed description hereinbelow.

In accordance with the present invention, therefore, a telephonic handset housing assembly for supporting therein a portable transceiver and a battery power supply is disclosed. The housing assembly includes a carriage having a recessed area extending therein for receiving the battery power supply thereat. The recessed area defines an opening upon a face surface of the carriage. A clip for latching the carriage to an external object is releasably engageable with the carriage. The clip may be attached to the carriage in releasable engagement thereat. The clip is attached in releasable engagement by engagement within the recessed area of the carriage such that, when the clip is engaged thereat, the clip extends beyond the recessed area of the carriage. A cover substantially covers the opening defined by the recessed area, while permitting extension of the clip, when engaged with the carriage, beyond the recessed area of the carriage.

BRIEF DESCRIPTION OF THE DRAWINGS

The present invention will be better understood when read in light of the accompanying drawings in which:

FIG. 1 is a perspective view taken from a first side of the telephone handset housing assembly of a preferred embodiment of the present invention;

FIG. 9 is a perspective view of a cordless telephone including a handset and base portion of a preferred embodiment of the present invention.

DESCRIPTION OF THE PREFERRED EMBODIMENTS

Figure 2:
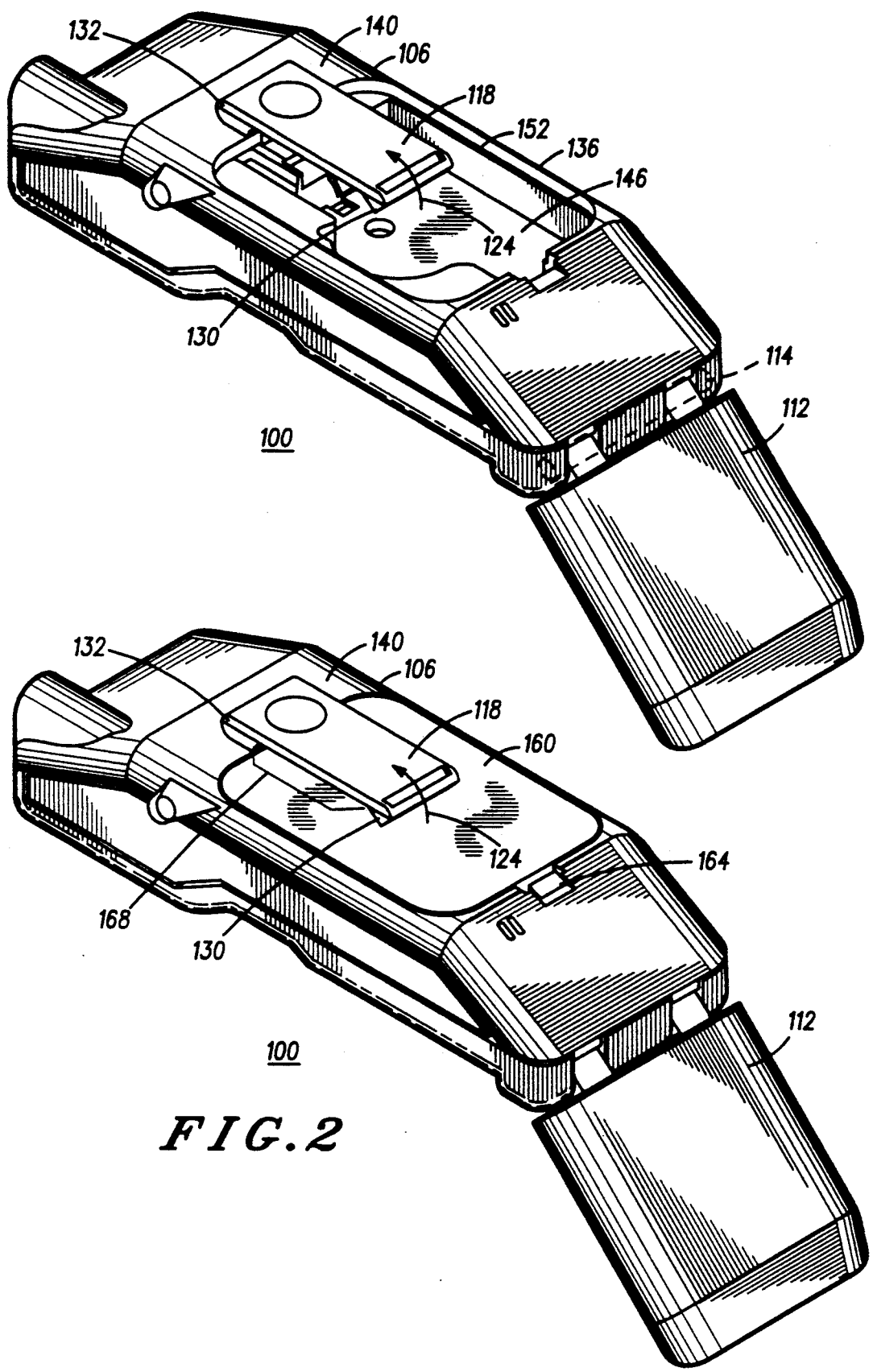
FIG. 2 is a perspective view, similar to that of FIG. 1, of the telephone handset housing assembly of a preferred embodiment of the present invention further illustrating a door for covering a recessed formed upon a face surface of a carriage forming a portion of the telephone handset.

Referring first now to the perspective view of FIG. 1, a telephone handset, referred to generally by reference numeral 100, of a preferred embodiment of the present invention is shown. Housing 100 comprises carriage 106, which, in the preferred embodiment, is formed of a thermoplastic material by an injection molding process.

Carriage 106 is of a size permitting a circuit board having transceiver circuitry disposed thereupon to be supported therewithin. A speaker and a microphone, which form portions of a conventional transceiver, are also supported within the carriage. Both the speaker and the microphone are suitably coupled to the transceiver circuitry disposed upon the circuit board housed within the carriage 106. In the preferred embodiment of FIG. 1, handset 100 further comprises carriage extension portion 112. Carriage extension portion 112 is hingedly coupled to carriage 106 by way of hinge 114 which is positioned in interfitting engagement with hinge arms formed integral with the carriage 106 and extension portion 112. Extension portion 112 is, similar to carriage 106, preferably formed of a thermoplastic material by an injection molding process.

Housing 100 further comprises clip 118, which is also preferably formed of a thermoplastic material. Clip 118 is elongated in a longitudinal direction thereof, and, when affixed in position to carriage 106 (as illustrated in FIG. 1), clip 118 forms a cantilever arm. Because clip 118 is comprised of the thermoplastic material, limited rotational movement is permitted of clip 118 in the direction indicated by arrow 124. The extent of the rotational movement permitted of clip 118 is dependent upon the elasticity of the material of which the clip is comprised. Angled lead-in 130 is formed at an end portion of clip 118 and overhang 132 is formed of an end portion of the clip at an end opposite that at which lead-in 130 is formed.

A recessed area is formed to extend into carriage 106 to define thereby opening 136 upon face surface 140 of the carriage. Bottom surface 146 of the recessed area defines a battery receiving surface for permitting positioning of a battery power supply in supportive engagement thereat. Preferably, and as illustrated, a lip, here referred to by reference numeral 152, is formed about a periphery of opening 136 defined upon face surface 140 of the carriage.

When forces are applied to clip 118 to cause rotation in a counter-clockwise direction, as indicated by arrow 124, forces exerted by such rotation are transmitted through overhang 132 to face surface 140 of carriage 106.

Turning now to the perspective view of FIG. 2, housing 100 of the preferred embodiment of the present invention is again shown. The perspective view of FIG. 2 includes similarly-numbered carriage 106, carriage extension portion 112, and clip 118 (which is permitted limited rotational movement in directions indicated by arrow 124) having angled lead-in 130 and overhang 132 formed at opposing ends thereof. Further shown in the perspective view of FIG. 2 is door 160 which covers opening 136 defined upon the face surface 140 of the carriage (opening 136 is shown in the perspective view of FIG. 1). In the preferred embodiment, door 160 seats against lip 152 formed about the periphery of the opening. When the depthwise dimensions of door 160 correspond with the depth of lip 152, a top surface of door 160 is positioned flush with the face surface 140 of carriage 106. Latch 164 integrally formed with door 160 latches door 160 to carriage 106.

When clip 118 is affixed in position as shown in FIG. 2, an area extending between overhang 132 and a side surface of angled lead-in 130, indicated by arrow 168, and bounded from above by a bottom surface of clip 118, and bounded from below by a top surface of door 160, is formed. The area defined by the arrow 168 forms an engaging area at which an external object may be located to affix housing 100 thereto by way of clip 118.

Figure 3:
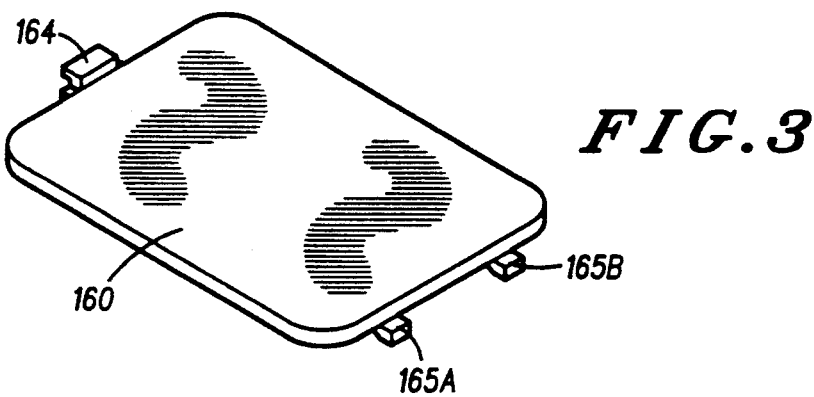
FIG. 3 is a perspective view, in isolation, of the door shown in FIG. 2 which covers the recessed area formed to extend into the carriage of the handset housing assembly of FIG. 2.

FIG. 3 is a perspective view of door 160 which covers the opening 136 upon face surface 140 of carriage 106 defined by the recessed area extending therein. Door 160 is of dimensions corresponding to the opening defined upon face surface 140, and is of a thickness corresponding to the height of the lip 152 formed about the periphery of the opening formed upon face surface 140 of carriage 106. Latch 164 is integrally formed with the door at a first end thereof to latchingly engage with a mated area formed to extend into carriage 106 to affix the door 160 in position when the door is seated against lip 152. Spaced-apart tabs 165A and 165B are formed to extend beyond a bottom portion of door 160 at a second end thereof.

Figure 4:
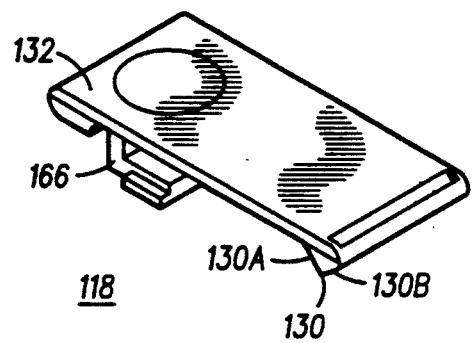
FIG. 4 is a perspective view of the clip forming a portion of the preferred embodiment of the handset housing assembly of the present invention.

FIG. 4 is a perspective view of clip 118, here shown in isolation. As previously mentioned, clip 118 is preferably comprised of a thermoplastic material and is elongated in a longitudinal direction thereof. Angled lead-in 130 is formed at one end of clip 118 and is here shown to form first and second angled side portions 130A and 130B, respectively. Formed at an end of clip 118 opposite that of angled lead-in 130 is overhang 132. Formed integral with clip 118 and extending downwardly beneath a bottom surface thereof is hooked projection 166. Hooked projection 166 is operative to permit affixation of the clip to carriage 106, as shown in the preceding Figures.

Figure 5A:
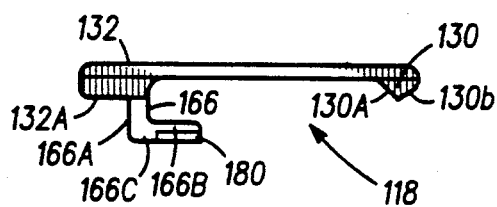
FIG. 5A is a side, elevational view of the clip of FIG. 4.
Figure 5B:
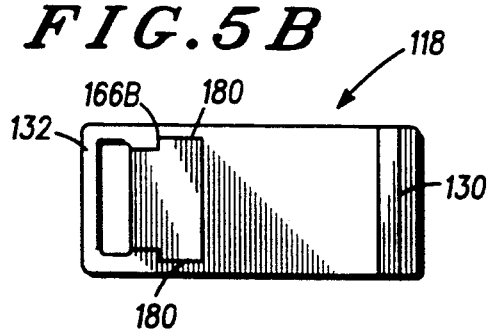
FIG. 5B is a bottom view of the clip of FIG. 4.
Figure 5C:
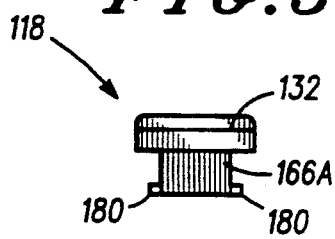
FIG. 5C is an end view, taken from a first end, of the clip of FIG. 4.

FIGS. 5A, 5B, and 5C are side-elevational, bottom, and end views, respectively, of clip 118. The side, elevational view of FIG. 5A again illustrates angled lead-in 130 defined by angled portions 130A and 130B, overhang 132, and hooked projection 166. The side, elevational view of FIG. 5A further illustrates a bottom face surface of overhang 132, here referred to by reference numeral 132A. When clip 118 is affixed to the carriage, forces applied to clip 118 to cause rotation thereof are transmitted to surface 140 of carriage 106 by way of bottom face surface 132A of overhang 132.

The side, elevational view of FIG. 5A further illustrates hooked projection 166 to be comprised of first portion 166A and second portion 166B. Portion 166A is connected at one end thereof to the bottom surface of clip 118, and is connected at a second end thereof to second portion 166B. Second portion 166B of hooked projection 166 extends in a direction perpendicular to that of the longitudinal direction of first portion 166A. A central bight section 166C defined at the connection of first and second portions 166A-B of hooked projection 166 is formed thereby. Track 180 formed upon a side of second portion 166B is further illustrated in the side, elevational view of FIG. 5A.

The bottom view of FIG. 5B illustrates clip 118, angled lead-in 130, overhang 132, second portion 166B of hooked projection 166, and tracks 180 formed upon sides of second portion 166B. Tracks 180 formed upon opposing sides of second portion 166B extend in parallel directions, and are symmetrical about a longitudinal axis extending through second portion 166B.

The end view of FIG. 5C, taken from behind overhang 132, illustrates overhang 132, first portion 166A of hooked projection 166 which extends beneath a bottom surface of clip 118, and track members 180 disposed upon opposite sides of second portion 166B of hooked projection 166.

Figure 6:
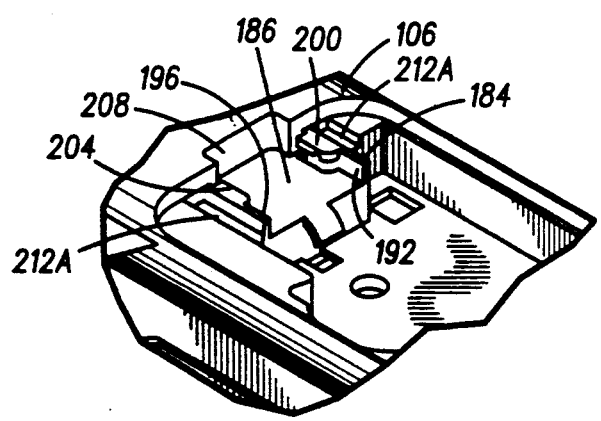
FIG. 6 is a cut away view of a portion of the recessed area formed to extend into the carriage of the handset housing assembly of the preceding figures, and, in particular, illustrates a detent forming a portion of the preferred embodiment of the present invention.

FIG. 6 is a cut away view of a portion of the recessed area extending into carriage 106, and, in particular, illustrates in greater detail detent 184 which is formed within the recessed area. Detent 184 is operative to receive hooked projection 166 of clip 118 to affix the clip in position thereby. Detent 184 defines clip receiving surface 186, sidewalls 192 and 196, longitudinally-extending grooves formed in sidewalls 192 and 196 formed by overhangs 200 and 204, and upstanding rear wall 208. Clip receive surface 186 is formed to be of dimensions suitable to receive second portion 166B of hooked projection 166 thereupon. The grooves defined by overhangs 200 and 204 permit translation of tracks 180 therealong. Sliding translation of the hooked projection 166 formed integral with clip 118 is permitted until a side of first portion 166A of the hooked projection abuts against the rear wall 208. Rear wall 208 extends between face surface 114 of carriage 106 and clip receiving surface 186, and defines the distance below face surface 114 at which clip receiving surface 186 is disposed. The height of rear wall 208 is selected such that, when the hooked projection is affixed in position at a locking position upon detent 184, clip member 118 extends above face surface 114, as illustrated in FIGS. 1-2. Tracks 212A and 212B are additionally formed within the recessed area and are spaced apart by distances and are of dimensions to permit sliding engagement of tabs 165A and 165B of door 160 therealong.

Figure 7:
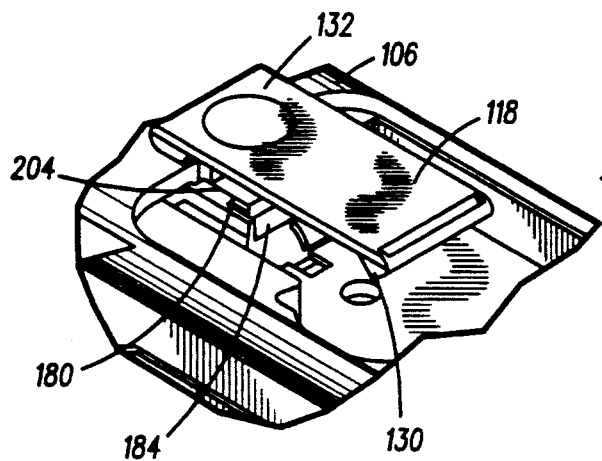
FIG. 7 is a cut away view similar to that of FIG. 5, but illustrating a hooked projection forming a portion of the clip positioned in locking engagement at the detent formed within the recessed area of the carriage.

FIG. 7 is a cut away view, similar to that of FIG. 6 of a portion of the recessed area extending into carriage 106. FIG. 6 further illustrates clip 118 in fixed engagement at a locking position at detent 184. A side of first portion 166A of hooked projection 166 abuts against rear wall 208, the track members disposed upon opposing sides of second portion 166B of hooked projection 166 are engaged in grooves defined by overhangs 200 and 204, and a bottom face surface (face surface 132A of FIG. 4A) abuts upon face surface 114 of carriage 106. When positioned at the locking position, clip member 118 is affixably engaged with carriage 106. As previously mentioned, rotational forces exerted upon clip 118 are transmitted to carriage 106. Such forces are transmitted not only to face surface 140, as previously mentioned, by way of overhang 132, but, additionally, to overhangs 200 and 204 by way of tracks 180 formed upon the opposing sides of portion 166B of hooked projection 166.

One clip 118 is affixed to carriage 106, door 160, shown in the perspective view in FIGS. 2-3, may be seated against lip 152 to cover the recessed area thereby. The clip 118 may be utilized to latch housing 100 to an external object, by positioning of the external object at the engaging area 144 defined between overhang 132 and angled lead-in 130 over clip member 118.

Figure 8:
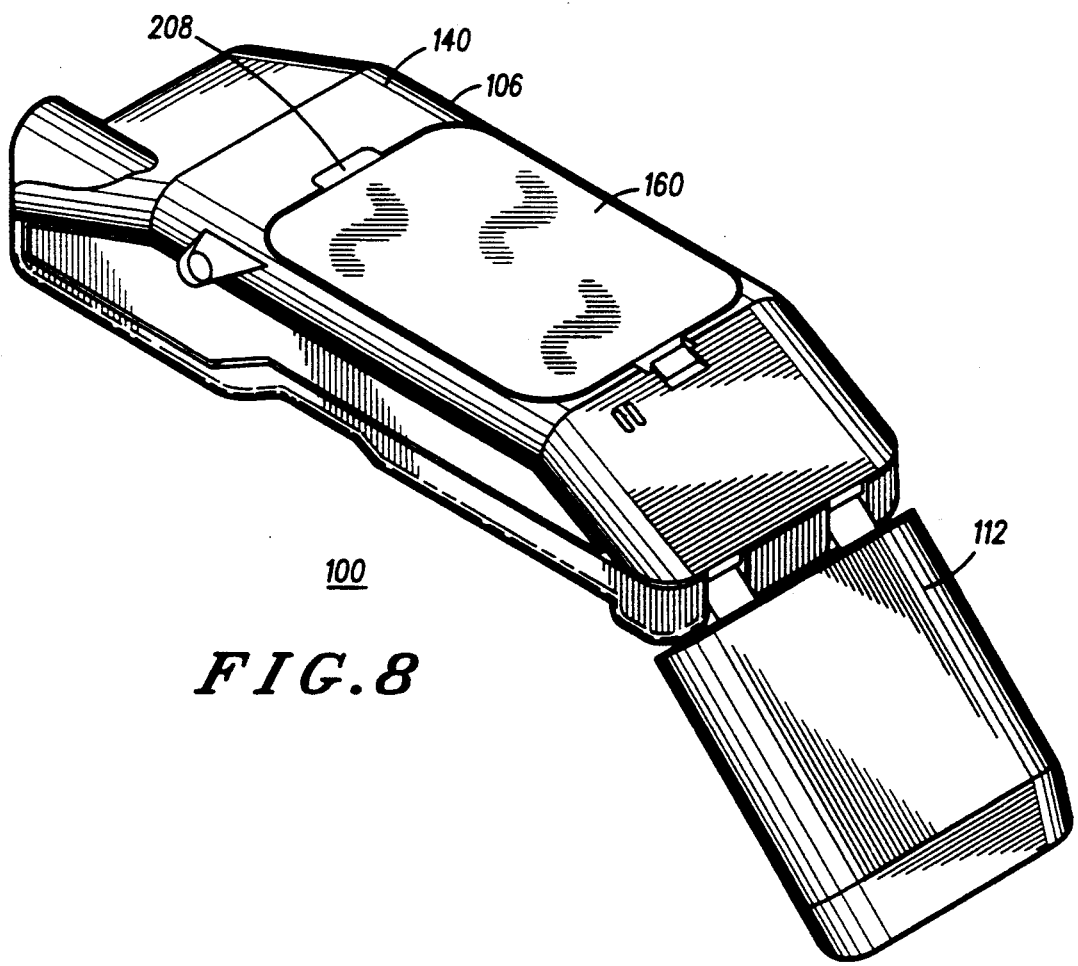
FIG. 8 is another perspective view of the telephone handset assembly of a preferred embodiment, here illustrating the assembly when the clip is not affixed to the carriage.

FIG. 8 is a perspective view of housing 100, similar to the views of FIGS. 1-2, but illustrating housing 100 when clip 118 is disengaged from carriage 106, and is not carried therewith. During times in which a user of a cordless telephone does not require use of clip 118, clip 118 may be removed by releasing hooked projection 166 from engagement with detent 184 formed within the recessed area extending into carriage 106. As door 160 seats against lip 152, top surfaces of door 160 and the face surface 140 of carriage 106 are flush with one another.

Turning finally now to the perspective view of FIG. 9, a cordless telephone, referred to generally by reference numeral 400, is illustrated. Telephone 400 comprises base portion 406 and handset 412. Transceiver circuitry is housed within base portion 406 for transmitting and for receiving radio frequency signals. Antenna 418 which extends beyond the housing of base portion 406 of the telephone is operative to receive radio frequency signals transmitted thereto and to transmit signals supplied thereto by the transceiver circuitry housed within base portion 406. The circuitry housed within the housing of base portion 406 is connected to a conventional telephonic network, here indicated by conventional telephone receptacle 424 by way of connector 430. Connector 430 is coupled to the transceiver circuitry housed within base portion 406 by cable 436. Similarly, the circuitry housed within the housing of base portion 406 is powered by connection to a conventional power supply, here indicated by power receptacle 444 to which the circuitry within base portion 406 is electrically connected by way of pronged connector 450. Pronged connector 450 is coupled to the transceiver circuitry housed within base portion 406 by power cable 456.

A recessed area 462 defined by opposing sidewalls is formed in a top surface of the housing of bottom portion 406. Recessed area 462 forms a handset receiving surface 466 and is of dimensions permitting insertion of a portion of handset 412 therewithin. Opposing prongs 464 and 468 protruding beyond the sidewalls defining recessed area 462 permit mated engagement with corresponding depressions formed upon side surfaces of the housing of handset 412.

A second recessed area, referred to by reference numeral 480, is formed to extend beneath handset receiving surface 466 to form a well thereby. Recessed area 480 permits nesting therein of a clip, corresponding to clip 118 shown in the preceding Figures, when the clip is engaged with the housing of the handset 412.

Handset 412 includes housing 500 having carriage 506, and carriage extension portion 512. Housing 500 is similar to housing 100 shown in preceding figures, but the view of FIG. 9 is taken from a different view than those of FIGS. 1-3, and 8. Further illustrated are speaker detent 546 and keypad 552. Formed upon opposing outer sidewalls of housing 500 are sidewall depressions 560 and 566, respectively.

When cordless telephone 400 is not used, handset 412 may be stored by seating of sidewall depressions 560 and 566 against corresponding prongs 464 and 468 protruding beyond sidewalls defining recessed area 462. When a user desires to utilize handset 412, the handset is removed from the well, and carried to any position within the transmission range of the circuitry forming transceivers of bottom portion 406 and handset 412. When the clip member of the housing (shown in the preceding Figures) of the handset is in affixed engagement with the carriage (by engaging hooked projection of the clip with the detent formed within the recessed area extending beneath the face of the carriage of the handset), handset 412 may be latched to an object to be carried thereby. When a user does not care to latch the handset to an object to carry the handset thereby, the clip may be removed from its engagement with the detent, and the handset may be carried by other means. Because the clip may be removed from the carriage when the clip is not desired to be used, the aesthetic appearance of the handset is not disturbed. Additionally, because the face surface of the carriage is flat, and the handset may be positioned in abutting engagement upon any flat surface.

While the present invention has been described in connection with the preferred embodiments shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

We claim:

1. A telephonic handset housing assembly for supporting therein a portable transceiver and a battery power supply, said handset housing assembly having:
    a carriage having means forming a recessed area extending therein for receiving the battery power supply thereat, the recessed area formed thereby defining an opening upon a face surface of the carriage and a battery receiving surface disposed in a plane beneath a plane defined by the face surface of the carriage, said battery receiving surface for receiving the battery power supply thereupon;
    attachment means forming a clip for latching the carriage to an external object, the clip formed thereby being releasably engageable with the carriage, said clip comprised of a strip formed of a flexible material and elongated in a longitudinal direction to form a cantilevered arm when engaged with the carriage said attachment means further comprised and having a hooked projection formed integral with the strip said hook projection comprised first and second portions wherein the first portion is attached at one end thereof to a bottom surface of the strip forming the clip to extend downwardly therefrom, and the second portion is attached at a second end of the first portion to extend at an angle relative to a longitudinal direction of the first portion to form a central bight section at the connection between the first and second portions for attaching the clip to the carriage in releasable engagement thereat, and track members formed upon side portions of the second portion of the hooked projection;

means comprising a detent formed within the recessed area which defines a clip receiving surface and longitudinally-extending sidewalls having grooves formed therein for receiving the track members of the hooked projection thereat to permit sliding engagement of the track members therealong to position the hooked projection at a locking position whereat the clip is affixed in position against the carriage; and means forming a cover for substantially covering the opening defined by the recessed area and the hooked projection of the attachment means while permitting extension of the clip, when engaged with the carriage, beyond the recessed area of the carriage.

2. The handset housing assembly of claim 1 wherein the strip forming the clip further comprises an overhang extending beyond the first end thereof, said overhang having a bottom surface for abutting against the face surface of the carriage when the clip is engaged with the carriage.

3. The handset housing assembly of claim 2 further comprising an angled lead-in formed at a second end of the strip forming the clip.

4. The handset housing assembly of claim 1 whereat the central bight section formed at the connection between the first and second portions of the hooked projection forms a right angle.

5. The handset housing assembly of claim 1 wherein the detent further comprises an upstanding rear wall formed at a rear side of the clip receiving surface and extending between the clip receiving surface and the face surface of the carriage.

6. The handset housing assembly of claim 5 wherein the upstanding rear wall extending between the clip receiving surface and the face surface of the carriage is of a length such that, when the hooked projection is positioned at the locking position, the clip member is positioned above the face surface of the carriage.

7. The handset housing assembly of claim 1 wherein the cover formed of the means for substantially covering comprises a door releasably engageable with the carriage alternately to cover the opening defined by the recessed area or to provide access to the detent formed within the receiving area.

8. The handset housing assembly of claim 7 further comprising a lip to extend into the carriage about the opening defined upon the face surface of the carriage for seating of the door comprising the cover thereupon.

9. A telephonic handset housing assembly for supporting therein a portable transceiver and a battery power supply which powers the portable transceiver, said handset housing assembly having:

a carriage having means forming a recessed area extending therein and defining a battery receiving surface of a recessed surface formed therefrom for receiving the battery power supply thereupon;

an elongated strip of flexible material forming a clip;

a hooked projection formed integral with the elongated strip, said hooked projection having a central bight section and first and second projection portions, respectively, wherein said first projection portion is attached at one end thereof to a bottom surface of the elongated strip to extend downwardly therefrom, and the second projection portion is connected at a second end of the first portion to extend at an angle perpendicular to the first projection portion to form the central bight section thereby where the first and second portions are connected theretogether;

track members formed upon side portions of the second projection portion;

a detent formed within the recessed area for receiving the hooked projection in releasable engagement thereat, said detent defining a clip receiving surface and longitudinally-extending sidewalls having grooves formed therein for permitting the sliding engagement of the tracks of the hooked projection along the grooves formed therein; and a door for substantially covering the opening defined by the recessed area while permitting extension of the clip, when engaged with the carriage, beyond the recessed area of the carriage.

10. In a cordless telephone having a base and a handset including a portable transceiver and a battery power supply, a combination with the handset of:

a carriage having means forming a recessed area extending therein for receiving the battery power supply thereat, the recessed area formed thereby defining an opening upon a face surface of the carriage and a battery receiving surface disposed in a plane beneath a plane defined by the face surface of the carriage, said battery receiving surface for receiving the battery power supply thereupon;

attachment means forming a clip for latching the carriage to an external object, the clip formed thereby being releasably engageable with the carriage, said clip comprised of a strip formed of a flexible material and elongated in a longitudinal direction to form a cantilevered arm when engaged with the carriage said attachment means further comprised a hooked projection formed integral with the strip said hook projection comprised first and second portions wherein the first portion is attached at one end thereof to a bottom surface of the strip forming the clip to extend downwardly therefrom, and the second portion is attached at a second end of the first portion to extend at an angle relative to a longitudinal direction of the first portion to form a central bight section at the connection between the first and second portions for attaching the clip to the carriage in releasable engagement thereat, and track members formed upon side portions of the second portion of the hooked projection;

means comprising a detent formed within the recessed area which defines a clip receiving surface and longitudinally-extending sidewalls having grooves formed therein for receiving the track members of the hooked projection thereat to permit sliding engagement of the track members therealong to position the hooked projection at a locking position whereat the clip is affixed in position against the carriage; and means forming a cover for substantially covering the opening defined by the recessed area and the hooked projection of the attachment means while permitting extension of the clip, when engaged with the carriage, beyond the recessed area of the carriage.

* * * * *